(12) United States Patent  
Seo

(10) Patent No.: US 9,413,631 B2  
(45) Date of Patent: Aug. 9, 2016

(54) COMMUNICATION CIRCUIT, PHYSICAL QUANTITY MEASUREMENT DEVICE, ELECTRONIC APPARATUS, MOVING OBJECT, AND COMMUNICATION METHOD

(71) Applicant: Seiko Epson Corporation, Tokyo (JP)

(72) Inventor: Kentaro Seo, Minowa (JP)

(73) Assignee: Seiko Epson Corporation (JP)

( * ) Notice: Subject to any disclaimer, the term of this patent is extended or adjusted under 35 U.S.C. 154(b) by 122 days.

(21) Appl. No.: 14/259,412

(22) Filed: Apr. 23, 2014

(65) Prior Publication Data

US 2014/0325295 A1   Oct. 30, 2014

(30) Foreign Application Priority Data

Apr. 24, 2013   (JP) .................................. 2013-091038

(51) Int. Cl.
*H04L 12/26* (2006.01)
*H04L 1/16* (2006.01)

(52) U.S. Cl.
CPC .............. *H04L 43/50* (2013.01); *H04L 1/1692* (2013.01)

(58) Field of Classification Search
CPC .................................................. H04L 13/2697
USPC ................................. 714/712, 748, 749, 819
See application file for complete search history.

(56) References Cited

U.S. PATENT DOCUMENTS

| 4,815,106 A * | 3/1989 | Propp ..................... H04B 3/542 340/12.34 |
| 8,060,023 B2 * | 11/2011 | Usuda ................... H04L 1/0007 370/231 |
| 2012/0030419 A1 | 2/2012 | Chino | |
| 2013/0022011 A1* | 1/2013 | Enomoto .............. H04L 1/0026 370/329 |

FOREIGN PATENT DOCUMENTS

| JP | 2009-105731 | 5/2009 |
| JP | 2012-032262 | 2/2012 |

* cited by examiner

*Primary Examiner* — Fritz Alphonse
(74) *Attorney, Agent, or Firm* — Harness, Dickey & Pierce, P.L.C.

(57) ABSTRACT

A communication circuit (an interface section) includes an input section (a input shift register) to which a data signal is input, an output section (and output shift register) adapted to output a reply signal in a case in which the data signal is input, and a command determination section adapted to perform propriety determination of a command signal included in the data signal, and the output section outputs a negative acknowledgement signal as the reply signal in a case in which it is determined in the propriety determination that the command signal is improper.

18 Claims, 12 Drawing Sheets

| COMMAND SYMBOL | COMMAND NAME | MODE | REMARKS |
|---|---|---|---|
| RR | REGISTER READ COMMAND | FIRST MODE | DESIGNATION OF REGISTER ADDRESS |
| SC | START COMMAND | SECOND MODE | START INSTRUCTION OF DIAGNOSTIC COMMAND |
| OC | OUTPUT COMMAND | SECOND MODE | OUTPUT INSTRUCTION OF DIAGNOSTIC COMMAND |
| SR | SOFTWARE RESET | THIRD MODE | THIS COMMAND CAN BE CONSTITUTED BY A PLURALITY OF CODES. |
| NE | NON-EXISTENT COMMAND | — | NON-EXISTENT REGISTER ADDRESS, ETC. |

FIG. 8

COMMUNICATION CIRCUIT, PHYSICAL QUANTITY MEASUREMENT DEVICE, ELECTRONIC APPARATUS, MOVING OBJECT, AND COMMUNICATION METHOD

BACKGROUND

1. Technical Field

The present invention relates to a communication circuit, a physical quantity measurement device, an electronic apparatus, a moving object, a communication method, and so on.

2. Related Art

In recent years, devices having an interface compliant with the I$^2$C bus communication protocol using the I$^2$C (a registered trademark) using a master-slave system have become widely used. The I$^2$C bus is composed of two serial buses formed of one clock signal line and one data signal line, and by connecting one master device and a plurality of slave devices to these signal lines, a high-speed data communication system can be established at low cost. In, for example, JP-A-2012-32262, there is described the fact that the I$^2$C bus can be adopted as a bus for a sensing device.

In the I$^2$C bus communication protocol, the master device has the initiative of the data communication, and performs the data communication with one of the slave devices connected to the I$^2$C bus. Since the master device is not allowed to perform the data communication with a plurality of slave devices at the same time, a command signal output by the master device includes an address value (ID) called a slave address for identifying each of the slave devices. Then, when the slave device having the own ID equal to the slave address included in the command signal output by the master device sends an ACK signal (ACKnowledgement signal) back to the master device, the data communication is thereafter performed between the master device and that slave device.

Here, JP-A-2009-105731 discloses a data communication system including a communication control device to thereby make it possible to connect a plurality of slave devices having the same address values while using the I$^2$C bus communication protocol.

Here, in order to perform the reliable communication, it is preferable to perform a propriety determination of the command signal from the master device, namely to determine whether or not the command signal includes an error. Further, if there is an error in the command signal, it is preferable for the slave device to immediately notify the master device in order to realize a high-speed data communication system. This is because if the master device immediately receives the error notification, a response such as retransmission becomes possible. However, in the related-art transmission compliant with the I$^2$C bus communication protocol, the slave device is not allowed to notify the master device of the occurrence of the error unless the slave device newly receives the command signal for determining presence or absence of the error from the master device.

SUMMARY

An advantage of some aspects of the invention is to provide a communication circuit, a physical quantity measurement device, an electronic device, a moving object, a communication method, and so on capable of performing the data communication based on the communication protocol using the maser-slave system, and immediately notifying the master device of an abnormality of the command signal.

The invention can be implemented as the following forms or application examples.

Application Example 1

A communication circuit according to this application example includes an input section to which a data signal is input, an output section adapted to output a reply signal in a case in which the data signal is input, and a command determination section adapted to perform propriety determination of a command signal included in the data signal, and the output section outputs a negative acknowledgement signal as the reply signal in a case in which it is determined in the propriety determination that the command signal is improper.

The communication circuit according to this application example is a communication circuit of a slave device for receiving the command signal from a master device. Further, the communication circuit according to this application example includes the input section, the output section, and the command determination section. The command determination section performs the propriety determination of the command signal. For example, whether or not a code (a combination of "0" and "1") of the command signal is compliant with the specification is determined.

The output section outputs the result of the propriety determination of the command signal, namely the negative acknowledgement signal due to the determination section, to the master device.

On this occasion, the master device can immediately be notified of the fact that the command signal is improper by the negative acknowledgement signal from the communication circuit according to this application example immediately after outputting the command signal. Therefore, in the case in which, for example, the code of the command signal is wrong, it is possible for the master device to make a response such as retransmission of the command signal with the code corrected. On this occasion, the master device is not required to additionally output a command signal to perform the propriety determination of the command signal, and thus, the communication quick in response can be realized.

In other words, the communication circuit according to this application example can immediately notify the master device of the defect of the command signal while performing the data communication based on the communication protocol using the master-slave system.

Application Example 2

A communication circuit according to this application example includes an input section to which a data signal is input, an output section adapted to output a reply signal subsequently to the input, and a command determination section adapted to perform propriety determination of a command signal included in the data signal, and the output section outputs a negative acknowledgement signal as the reply signal in a case in which it is determined in the propriety determination that the command signal is improper.

The communication circuit according to this application example outputs the result of the propriety determination of the command signal, namely the negative acknowledgement signal due to the determination section, to the master device subsequently to the input.

On this occasion, the master device can immediately be notified of the fact that the command signal is improper by the negative acknowledgement signal from the communication circuit according to this application example immediately after outputting the command signal. Therefore, in the case in which, for example, the code of the command signal is wrong, it is possible for the master device to make a response such as retransmission of the command signal with the code corrected. On this occasion, the master device is not required to additionally output a command signal to perform the propriety determination of the command signal, and thus, the communication quick in response can be realized.

In other words, the communication circuit according to this application example can immediately notify the master device of the defect of the command signal while performing the data communication based on the communication protocol using the master-slave system.

Application Example 3

In the communication circuit according to the application example described above, the output section may output the negative acknowledgement signal in a case in which the command signal designates a non-existent register address.

Application Example 4

In the communication circuit according to the application example described above, the output section may output the negative acknowledgement signal in a case in which the command signals are input to the input section in a sequence different from a proper sequence of a plurality of command signals constituting a connected command.

Application Example 5

In the communication circuit according to the application example described above, the connected command may correspond to software reset signal.

Application Example 6

In the communication circuit according to the application example described above, the connected command may correspond to a diagnostic command signal.

In the communication circuit according to this application example, the command determination section may make a determination that the command signal is improper in the case in which the command signal designates a non-existent register address as the propriety determination of the command signal. Further, the command determination section may make a determination that the command signal is improper in the case in which a part of the command signals constituting the connected command used for preventing the false recognition in, for example, the software reset is input in a sequence different from the proper sequence. Further, the command determination section may make a determination that the command signal is improper in the case in which a part of the command signals constituting the diagnostic command signal is received in a sequence different from the proper sequence. Then, the output section may output the negative acknowledgement signal to the master device in the case in which the command determination section determines that the command signal received is improper.

On this occasion, the communication circuit according to this application example outputs the negative acknowledgement signal not only due to, for example, the mismatch in the slave address, but also in the case in which the defect in the code of the command signal, or the defect in the sequence for receiving the command signals is detected. Therefore, it is possible for the communication circuit according to this application example to immediately notify the master device of the defect in the command signal, and to realize the communication quick in response.

Application Example 7

In the communication circuit according to the application example described above, the command determination section may perform the propriety determination based on a mode determined by the command signal, and the command signal.

In the communication circuit according to this application example, the command determination section is provided with a mode determined by the type of the command signal in execution. Further, the propriety determination can efficiently be performed based on the mode and the type of the command signal received.

For example, it is assumed that the command determination section can select a mode (hereinafter referred to as a first mode) corresponding to a command signal (hereinafter referred to as a register read command signal) for reading out the data of the register of the slave device, and a mode (hereinafter referred to as a second mode) corresponding to a diagnostic command signal as an operation mode (also referred to simply as a mode). It is assumed that the command signal (one of the diagnostic command signals) for requiring the output of the diagnostic data is received in the case in which the mode of the command determination section is set to the first mode. On this occasion, since the command signal is the command mode, which should be received in the case of the second mode, and the mode fails to match the present mode, namely the first mode, the determination section can determine the command signal received is improper. As described in this example, the communication circuit according to this application example can efficiently perform the propriety determination based on the modes and the types of the command signals.

Application Example 8

In the communication circuit according to the application example described above, the output section may output an acknowledgement signal as the reply signal in a case in which it is determined in the propriety determination that the command signal is proper.

Application Example 9

In the communication circuit according to the application example described above, the input section may perform the input in accordance with an I²C communication protocol, the acknowledgement signal may correspond to an ACK signal in the I²C communication protocol, and the negative acknowledgement signal may correspond to an NACK signal in the I²C communication protocol.

In the communication circuit according to this application example, the output section outputs the acknowledgement signal or the negative acknowledgement signal to the master device in accordance with the result of the propriety determination of the command signal, namely the determination that the command signal is proper or improper made by the determination section.

On this occasion, even in the case in which the master device is compliant with, for example, the I²C bus communication protocol using the half-duplex communication, the master device can immediately know the fact that the command signal is improper using the acknowledgement signal (e.g., the ACK signal of the I²C bus communication protocol)

or the negative acknowledgement signal (e.g., the NACK signal of the I²C bus communication protocol) from the communication circuit according to this application example immediately after outputting the command signal. Therefore, in the case in which, for example, the code of the command signal is wrong, it is possible for the master device to make a response such as retransmission of the command signal with the code corrected. On this occasion, the master device is not required to additionally output a command signal to perform the propriety determination of the command signal, and thus, the communication quick in response can be realized.

In other words, the communication circuit according to this application example can immediately notify the master device of the defect of the command signal while performing the data communication based on the communication protocol using the master-slave system.

Application Example 10

A physical quantity measurement device according to this application example includes the communication circuit according to any one of the application examples described above, and a sensor element adapted to output a detection signal corresponding to a physical quantity.

Application Example 11

An electronic apparatus according to this application example includes the communication circuit according to any one of the application examples described above.

Application Example 12

A moving object according to this application example includes the communication circuit according to any one of the application examples described above.

According to the physical quantity measurement device, the electronic apparatus, and the moving object related to this application examples, since the communication circuit described above is included, it is possible to determine whether or not the command signal includes an error and then immediately notify the master device even if the error exists. Therefore, the physical quantity measurement device, the electronic apparatus, and the moving object each high in reliability, and quick in response can be realized.

Application Example 13

A communication method according to this application example includes inputting a data signal, performing propriety determination of a command signal included in the data signal, and outputting a reply signal in a case in which the data signal is input, and in the outputting, a negative acknowledgement signal is output as the reply signal in a case in which it is determined in the propriety determination that the command signal is improper.

The communication method according to this application example is a communication method of a slave device for receiving the command signal from a master device. Even in the case in which the master device is compliant with, for example, the I²C bus communication protocol using the half-duplex communication, the master device can immediately know whether or not the command signal is proper using the negative acknowledgement signal of the communication method according to this application example immediately after outputting the command signal. Therefore, in the case in which, for example, the code of the command signal is wrong, it is possible for the master device to make a response such as retransmission of the command signal with the code corrected. On this occasion, the master device is not required to additionally output a command signal to perform the propriety determination of the command signal, and thus, the communication quick in response can be realized.

In other words, the communication method according to this application example can immediately notify the master device of the defect of the command signal while performing the data communication based on the communication protocol using the master-slave system.

BRIEF DESCRIPTION OF THE DRAWINGS

The invention will be described with reference to the accompanying drawings, wherein like numbers reference like elements.

FIG. 8 is a diagram for explaining commands received by the communication circuit according to the embodiment.

DESCRIPTION OF AN EXEMPLARY EMBODIMENT

Hereinafter, a preferred embodiment of the invention will be described in detail with reference to the accompanying drawings. It should be noted that the embodiment described below does not unreasonably limit the contents of the invention as set forth in the appended claims. Further, all of the constituents described below are not necessarily essential elements of the invention.

Figure 1:
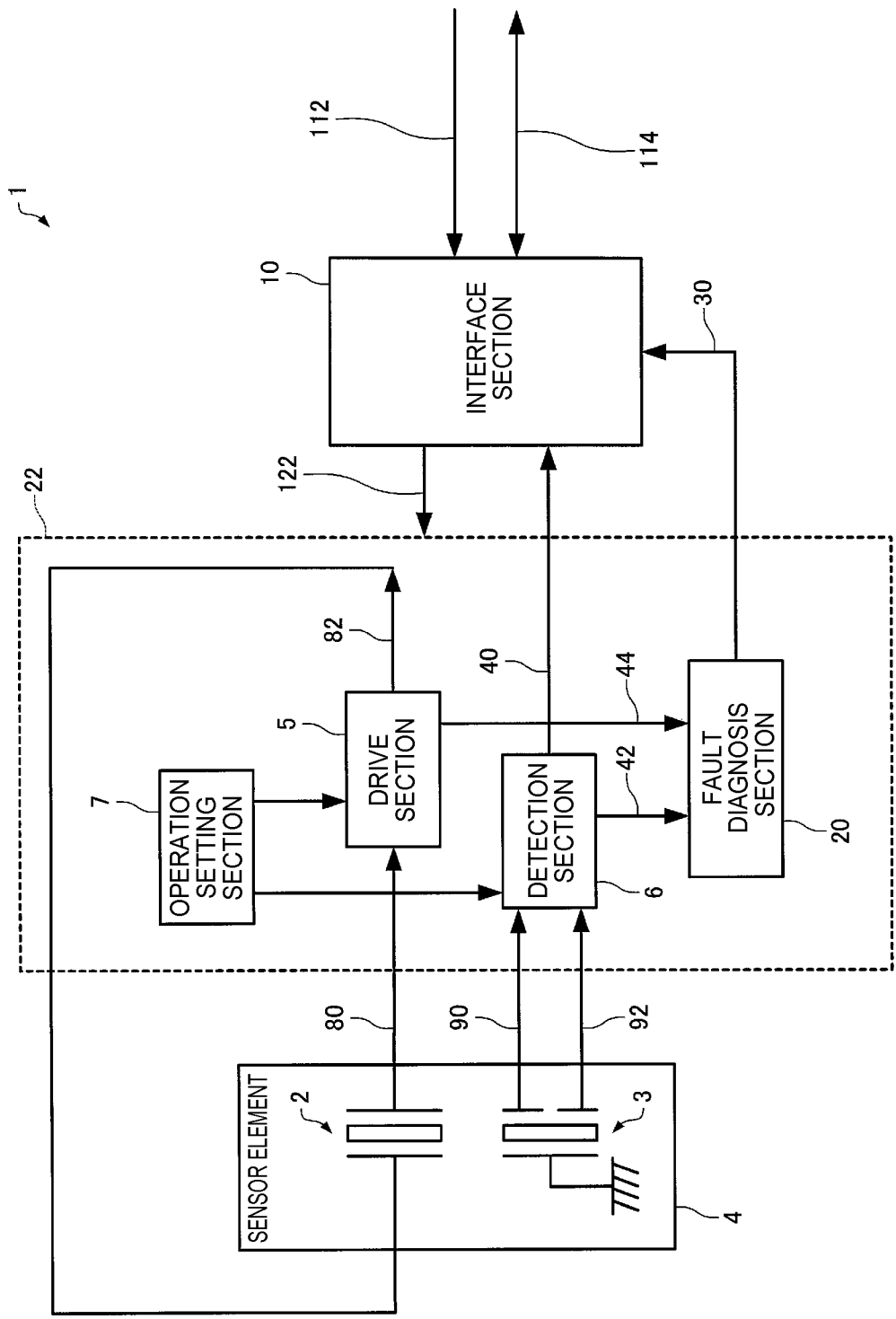
FIG. 1 is a diagram showing a configuration example of a physical quantity measurement device including a communication circuit according to an embodiment of the invention.

1. Configuration of Communication Circuit and Physical Quantity Measurement Device FIG. 1 is a diagram showing a configuration example of a physical quantity measurement device 1 including an interface section 10. The interface section 10 corresponds to the communication circuit according to the invention, and performs communication with a master device 110 (see FIG. 2) outside the physical quantity measurement device 1. The physical quantity measurement device 1 is one of slave devices connected to the master device 110.

The interface section 10 of the physical quantity measurement device 1 and the master device 110 are connected to each other with a serial bus 112 and a serial bus 114. The interface section 10 receives a clock signal from the master device 110 with the serial bus 112. Further, the interface section 10 receives a command signal from the master device 110 and outputs, for example, data required with the serial bus 114. In other words, the serial bus 114 is a bus for performing bidirectional data communication. Although in the present embodiment, the interface section 10 of the physical quantity measurement device 1 and the master device 110 perform communication in accordance with the I²C bus communication protocol, the communication protocol is not limited thereto, but it is also possible to use a communication protocol in accordance with another master-slave system. It should be noted that in FIG. 1, terminals (an SCL input terminal and an SDA input/output terminal) of the physical quantity measurement device 1 described later are omitted from the graphical description.

Figure 2:
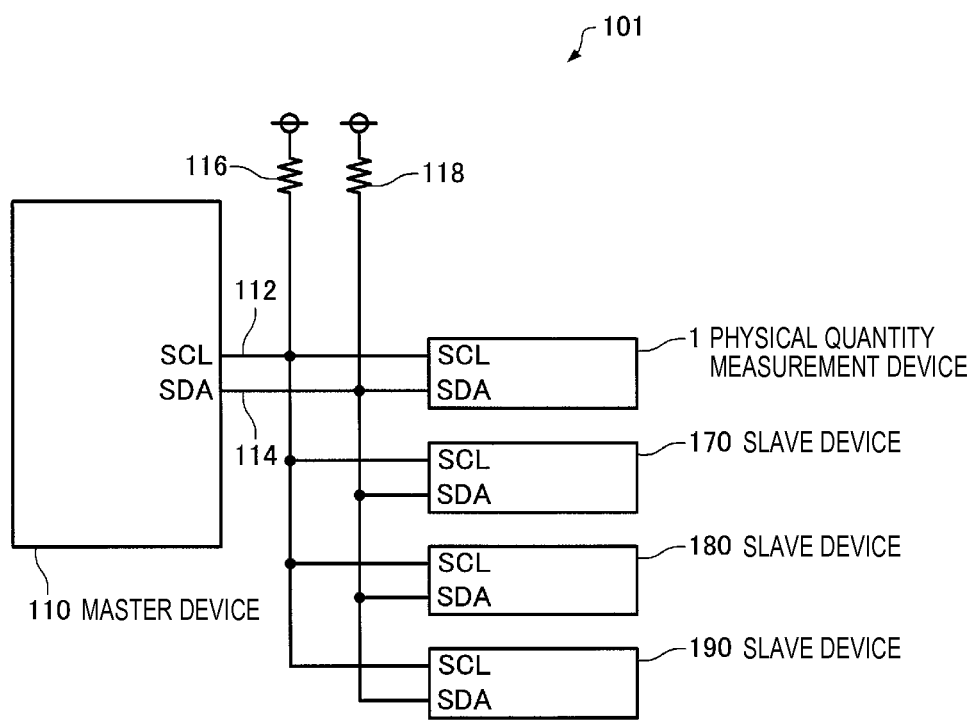
FIG. 2 is a diagram showing a connection example to a master device.

FIG. 2 is a diagram showing a connection example between the physical quantity measurement device 1 and the master device 110. As shown in FIG. 2, the master device 110, the physical quantity measurement device 1, and slave devices 170, 180, and 190 constitute a data communication system 101. It should be noted that in the data communication system 101, some of the slave devices 170, 180, and 190 can be eliminated, or some other slave devices can further be connected.

In the data communication system 101 shown in FIG. 2, an SCL output terminal of the master device 110 is connected to the SCL input terminals of the physical quantity measurement device 1 and the slave devices 170, 180, and 190 via the serial bus 112. Further, the SDA input/output terminal of the master device 110 is connected to the SDA input/output terminals of the physical quantity measurement device 1 and the slave devices 170, 180, and 190 via the serial bus 114. Further, the serial buses 112, 114 are connected to a power supply via pull-up resistors 116, 118, respectively.

The master device 110 functions as a master in the I²C bus communication protocol, and the physical quantity measurement device 1 and the slave devices 170, 180, and 190 function as slaves in the I²C bus communication protocol. In other words, the master device 110 has an initiative of the data communication. When performing the data communication, the master device 110 outputs (transmits) a clock signal from the SCL output terminal to the serial bus 112. When the master device 110 does not output the clock signal from the SCL output terminal, the serial bus 112 is released, and is therefore pulled up to a high-level potential (a power supply potential) via the resistor 116.

The master device 110, the physical quantity measurement device 1, and slave devices 170, 180, and 190 can output (transmit) the data signal to the serial bus 114 via the SDA input/output terminal, and can also input the data on the serial bus 114. Here, the data output from the master device 110 is hereinafter referred to as command data in order to distinguish the data from other data from the slave devices. It should be noted that when neither of the master device 110, the physical quantity measurement device 1, and the slave devices 170, 180, and 190 outputs the data to the serial bus 114, the serial bus 114 is released, and is therefore pulled up to the high-level potential (the power supply potential) via the resistor 118.

Until the data communication is started, the serial bus 112 and the serial bus 114 are both pulled up to the high-level potential. In the case of starting the data communication, the master device 110 makes a transition of the serial bus 114 from the high level to a low level (a start condition) when the serial bus 112 (the clock signal) is in the high level. After executing the start condition, the master device 110 outputs a predetermined command signal to thereby perform the data communication with the physical quantity measurement device 1 and the slave devices 170, 180, and 190. In the case of terminating the data communication, the master device 110 makes a transition of the serial bus 114 from the low level to the high level (a stop condition) when the serial bus 112 (the clock signal) is in the high level.

Referring again to FIG. 1, the physical quantity measurement device 1 will be explained. The physical quantity measurement device 1 includes a sensor element 4, a drive section 5, a detection section 6, an operation setting section 7, and a fault diagnosis section 20 besides the interface section 10.

The sensor element 4 includes, for example, vibrators 2, 3 integrated with each other to detect an angular velocity. Here, a signal corresponding to the magnitude of the angular velocity, and output by the sensor element 4 is referred to as a detection signal. In FIG. 1, the detection signal corresponds to differential signals 90, 92. It should be noted that the detection signal can also be a single-ended signal.

The drive section 5 generates a drive signal 82, and then supplies the drive signal 82 to the vibrator 2, and receives an excitation current 80 from the vibrator 2 to form an oscillation loop. The magnitude of the differential signals 90, 92 is proportional to the excitation current 80. Therefore, the drive section 5 controls the drive signal 82 so that the amplitude of the excitation current 80 becomes constant irrespective of a change in the measurement environment.

The detection section 6 generates an output signal 40 based on the differential signals 90, 92. The output signal 40 is output to the master device 110 via the interface section 10. It is also possible for the detection section 6 to receive the differential signals 90, 92, and perform, for example, a conversion into a format required by the master device 110 to generate the output signal 40.

The operation setting section 7 is capable of setting the operation of the drive section 5 and the detection section 6. The operation setting section 7 performs voltage setting and parameter setting of the drive section 5 and the detection section 6, and so on to thereby perform optimization corresponding to the operation environment. It should be noted that it is also possible for the master device 110 to provide the operation setting section 7 with instructions via the interface section 10.

The fault diagnosis section 20 performs a fault diagnosis on at least one of the drive section 5 and the detection section 6. In the present embodiment, the fault diagnosis is performed on both of the drive section 5 and the detection section 6. The fault diagnosis section 20 receives internal signals 42, 44 representing the states of the drive section 5 and the detection section 6 to perform the fault diagnosis.

A fault diagnosis signal 30 represents the result of the fault diagnosis performed by the fault diagnosis section 20. The fault diagnosis signal 30 can also be a signal of several bits representing respective results (each set to, for example, the high level "1" at an error) of the fault diagnoses performed by the fault diagnosis section 20. The fault diagnosis signal 30 can be output to the master device 110 via the interface section 10.

Here, the drive section 5, the detection section 6, the operation setting section 7, and the fault diagnosis section 20 (a circuit group 22 shown in FIG. 1) except the sensor element 4 are reset by a software reset signal 122. The software reset signal 122 becomes active when the interface section 10 receives the command signal (software reset) from the master device 110 a plurality of times. In other words, the software reset is a connected command signal the command of which is not executed unless a plurality of command signals is received in a predetermined sequence.

2. Types of Command Signals

Hereinafter, types and communication procedures of the command signals the interface section 10 receives from the master device 110 will be explained.

2.1. Register Read Command Signal

Figure 3:
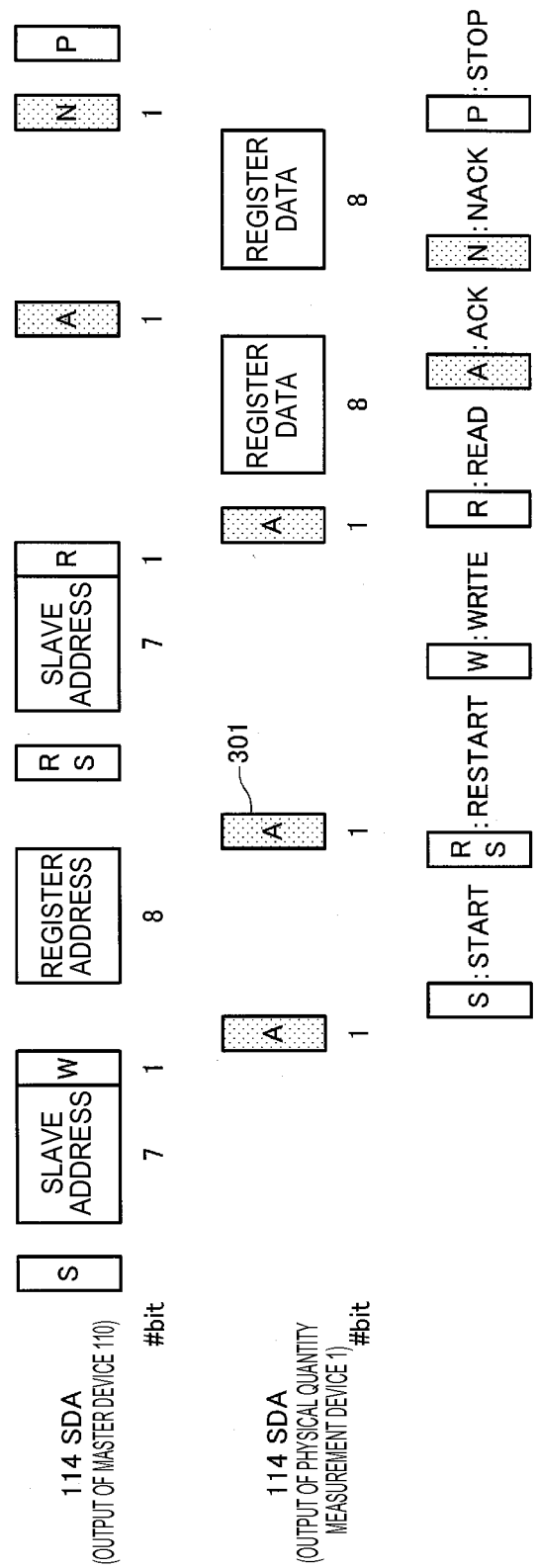
FIG. 3 is a diagram for explaining a communication procedure of a register read command.

FIG. 3 is a diagram for explaining the communication procedure of a register read command signal as a form of the command signal. The register read command signal is a command signal for reading out data in a register of the physical quantity measurement device 1. By designating a register address, the master device 110 can designate the data to be read out. Here, the data read out by the register read command signal is one of, for example, the output signal 40 based on the detection signal output by the sensor element 4 and the voltage setting and the parameter setting of the drive section 5 and the detection section 6. It is assumed that the output signal 40 is stored in a storage section 15 described later, and assigned with a register address. For example, the master device 110 can read out the angular velocity data by designating a certain register address, and read out the parameter setting of the drive section 5 by designating another register address using the register read command signal.

It should be noted that in FIG. 3 (the same applies to FIGS. 4A, 4B, and 6), only the data (including the command signals) on the serial bus 114 are shown, and the clock signal on the serial bus 112 is omitted. Further, for the sake of easy understanding, the data on the serial bus 114 is displayed so as to be separated into the output of the master device 110 and the output of the physical quantity measurement device 1. Further, the number of bits is shown below each of the names of the data (including the command signals). The data of 1 bit takes "0" or "1." For example, a 7-bit slave address takes a value such as "0101111," and the serial bus 114 changes to the low level corresponding to "0" or to the high level corresponding to "1."

As shown in FIG. 3, the master device 110 executes the start condition (S: START in FIG. 3), and then outputs the data signal including a 7-bit slave address for designating the physical quantity measurement device 1 and a write signal (W: WRITE in FIG. 3). It should be noted that the write signal is specifically in the low level, and a read signal described later is in the high level. In the case in which the correct slave address is designated, the physical quantity measurement device 1 outputs the ACK signal (A: ACK in FIG. 3) as a reply signal. It should be noted that the ACK signal is specifically in the low level, and an NACK signal (Negative ACKnowledgement signal) described later is in the high level.

Then, the master device 110 outputs the data signal including an eight-bit register address to designate the register to be read. In the case in which the register address thus designated exists, the physical quantity measurement device 1 outputs the ACK signal as the reply signal.

Subsequently, the master device 110 executes a restart condition (RS: RESTART in FIG. 3), and then outputs the 7-bit slave address for designating the physical quantity measurement device 1 and the read signal (R: READ in FIG. 3). In the case in which the correct slave address is designated, the physical quantity measurement device 1 outputs the ACK signal as the reply signal. It should be noted that the restart condition is the same as the start condition, and therefore, the explanation thereof will be omitted.

Then, the physical quantity measurement device 1 outputs the data (16-bit register data in this example) of the register address thus designated in twice. The master device 110 outputs the ACK signal as the reply signal in the case in which the first data (the first 1 byte) has been received correctly, and then outputs the NACK signal (N: NACK in FIG. 3) as the reply signal after the second data (the last 1 byte) has been received. Then, the master device 110 executes the stop condition (P: STOP in FIG. 3) to terminate the communication with the physical quantity measurement device 1.

2.2. Diagnostic Command Signal

Figure 4A:
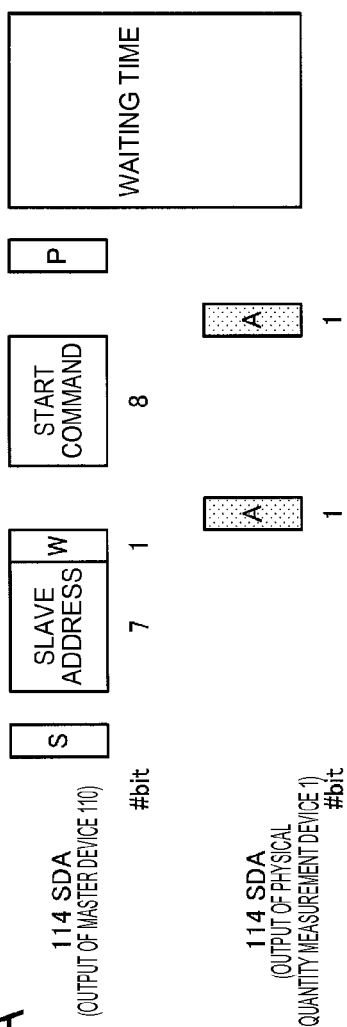
FIGS. 4A and 4B are diagrams for explaining a communication procedure of a diagnostic command.
Figure 4B:
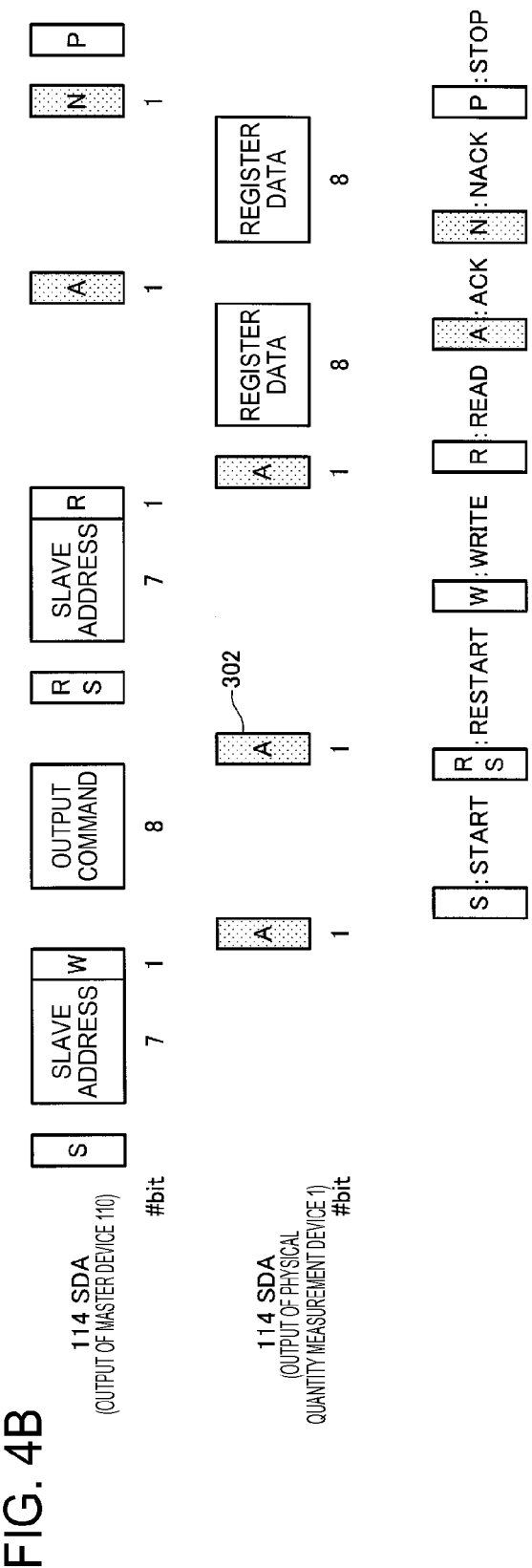

FIGS. 4A and 4B are diagrams for explaining the communication procedure of a diagnostic command signal as a form of the command signal. The diagnostic command signal provides the fault diagnosis section 20 with pseudo signals instead of the internal signals 42, 44 to make the fault diagnosis section 20 generate and then output the fault diagnosis signal 30 (corresponding to diagnostic data according to the invention) with which whether or not the fault diagnosis section 20 is at fault can be determined.

Here, the diagnostic command signal can output the diagnostic data when receiving a plurality of command signals in a predetermined proper sequence. As the diagnostic command signals according to the present embodiment, there can be cited a start command for providing the fault diagnosis section 20 with the pseudo signals, and an output command signal for outputting the fault diagnosis signal 30, which has been generated by the fault diagnosis section 20 based on the pseudo signals, to the master device 110. The physical quantity measurement device 1 is required to receive the start command signal first, and then receive the output command signal. In the case in which the sequence is not followed, it is not allowed to generate and then output the fault diagnosis signal 30 based on the pseudo signals.

FIG. 4A is a diagram for explaining the communication procedure of the start command signal among the diagnostic command signals. It should be noted that the same constituents as those shown in FIG. 3 are denoted with the same reference symbols, and the detailed explanation thereof will be omitted. The master device 110 executes the start condition, and then outputs the 7-bit slave address for designating the physical quantity measurement device 1 and the write signal. In the case in which the correct slave address is designated, the physical quantity measurement device 1 outputs the ACK signal.

The master device 110 outputs the start command signal, and then executes the stop condition after the physical quantity measurement device 1 outputs the ACK signal. Subsequently, the master device 110 waits until the fault diagnosis section 20 completes the fault diagnosis (the waiting time shown in FIG. 4A).

FIG. 4B is a diagram for explaining the communication procedure of the output command signal among the diagnostic command signals. It should be noted that the same constituents as those shown in FIGS. 3 and 4A are denoted with the same reference symbols, and the detailed explanation thereof will be omitted. The master device 110 executes the start condition, and then outputs the 7-bit slave address for designating the physical quantity measurement device 1 and the write signal. In the case in which the correct slave address is designated, the physical quantity measurement device 1 outputs the ACK signal.

The master device 110 outputs the output command signal, and then executes the restart condition after the physical quantity measurement device 1 outputs the ACK signal. Then, the master device 110 outputs the 7-bit slave address for designating the physical quantity measurement device 1 and the read signal. In the case in which the correct slave address is designated, the physical quantity measurement device 1 outputs the ACK signal.

Then, the physical quantity measurement device 1 outputs the data (16-bit register data in this example) of the fault diagnosis signal 30 based on the pseudo signals stored in the storage section 15 described later in twice. The master device 110 outputs the ACK signal in the case in which the first data (the first 1 byte) has been received correctly, and then outputs the NACK signal after the second data (the last 1 byte) has been received. Then, the master device 110 executes the stop condition to terminate the communication with the physical quantity measurement device 1.

Figure 5:
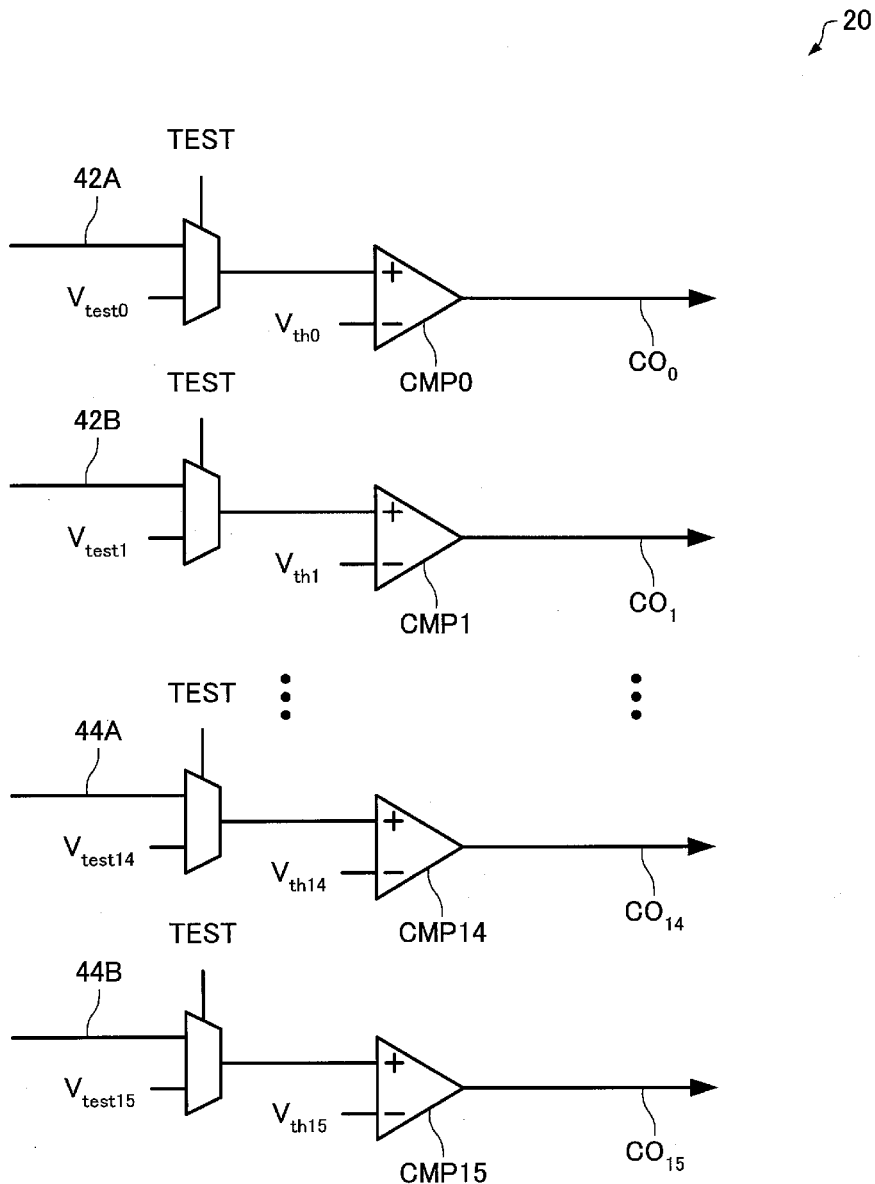
FIG. 5 is a diagram showing a configuration example of a fault diagnosis section.

Here, FIG. 5 is a diagram showing a configuration example of the fault diagnosis section 20, and explains a relationship between the start command signal and the output command signal. The fault diagnosis section 20 includes comparators CMP0 through CMP15, and compares the signals 42A, 42B, 44A, 44B, and so on representing the states of the operations of the drive section 5 and the detection section 6 and predetermined voltage values $V_{th0}$ through $V_{th15}$ with each other. It should be noted that the signals 42A, 42B correspond to the internal signal 42 shown in FIG. 1, and the signals 44A, 44B correspond to the internal signal 44 shown in FIG. 1.

Output signals $CO_0$ through $CO_{15}$ of the comparators CMP0 through CMP15 represent the results of the fault diagnosis, and correspond to the fault diagnosis signal 30 shown in FIG. 1. In this example, the high level of each of the output signals $CO_0$ through $CO_{15}$ represents the fact that a fault has occurred, and the low level thereof represents the fact that no fault has occurred but the state is normal.

Here, when receiving the start command signal from the master device 110, the physical quantity measurement device 1 switches the signal TEST of the fault diagnosis section 20 (changes the state of the signal TEST from the low level to the high level) to perform the fault diagnosis of the comparators CMP0 through CMP15 themselves. In the case in which the signal TEST shown in FIG. 5 is in the high level, voltage values $V_{test0}$ through $V_{test15}$ prepared in advance are input respectively to the comparators CMP0 through CMP15 instead of the signals 42A, 42B, 44A, 44B, and so on.

Then, when receiving the output command signal from the master device 110, the physical quantity measurement device 1 outputs the fault diagnosis signal 30 (corresponding to the register data shown in FIG. 4B), namely the output signals $CO_0$ through $CO_{15}$ obtained using the voltage values $V_{test0}$ through $V_{test15}$. In other words, if all of the bits of the 16-bit register data shown in FIG. 4B are "0" corresponding to the low level, the master device 110 can determine that the comparators CMP0 through CMP15 operate normally.

2.3. Connected Command Signal

Figure 6:
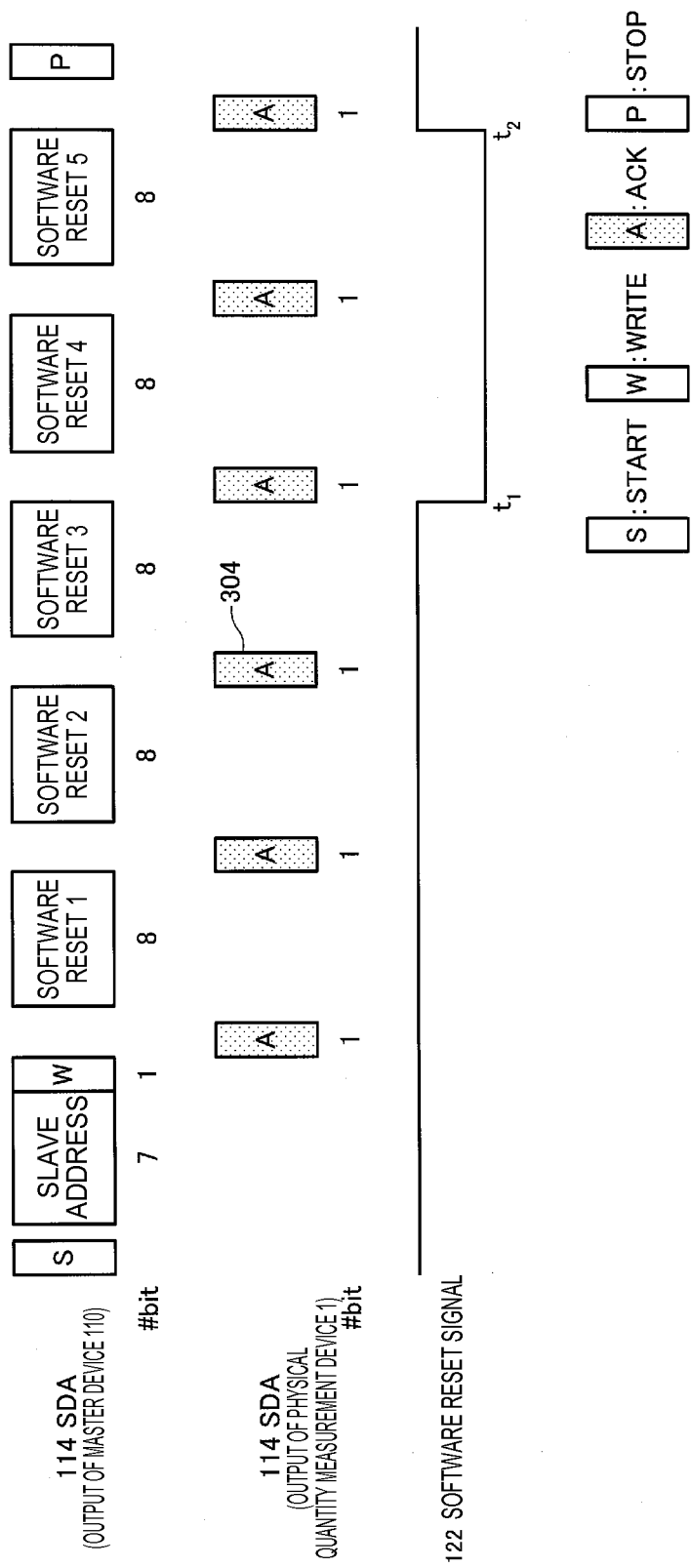
FIG. 6 is a diagram for explaining a communication procedure of a connection command.

FIG. 6 is a diagram for explaining the communication procedure of the connected command signal as a form of the command signal. It should be noted that the same constituents as those shown in FIGS. 3, 4A, and 4B are denoted with the same reference symbols, and the detailed explanation thereof will be omitted. In the connected command signal, one or more instructions are executed when a plurality of command signals is received in a predetermined sequence. The software reset for resetting the circuit group 22 shown in FIG. 1 corresponds to the connected command signal of the present embodiment.

Since the physical quantity measurement device 1 stops operating, it is necessary to avoid erroneously performing the software reset. Therefore, the interface section 10 does not set the software reset signal 122 to the low level to reset the circuit group 22 unless the command signal of the software reset is received continuously three times. For example, even if the command signal of the software reset is accidentally received once, the interface section 10 never sets the software reset signal 122 to the low level.

As shown in FIG. 6, the master device 110 executes the start condition, and then outputs the 7-bit slave address for designating the physical quantity measurement device 1 and the write signal. In the case in which the correct slave address is designated, the physical quantity measurement device 1 outputs the ACK signal.

The master device 110 subsequently outputs the command signals of software reset 1 through software reset 5. In the case of receiving the command signals in the correct order, the physical quantity measurement device 1 outputs the ACK signal for each of the command signals. After the physical quantity measurement device 1 outputs the ACK signal with respect to the software reset 5, the master device 110 performs the stop condition.

On this occasion, the interface section 10 of the physical quantity measurement device 1 sets the software reset signal 122 to the low level to reset the circuit group 22 at a time point $t_1$ after receiving the software reset 3 from the master device 110. Then, the interface section 10 resets the software reset signal 122 to the high level at a time point $t_2$ after receiving the software reset 5 from the master device 110.

It should be noted that the codes (combinations of "0" and "1") of the command signals of the software reset 1 through the software reset 5 can be the same as each other as in the present embodiment, or can partially or wholly different from each other. Further, the number of times of receiving the command signal of the software reset is not limited to five as in the present example, but is sufficiently equal to or larger than two.

2.4. Propriety Determination of Command Signals

In the example shown in FIGS. 3, 4A, 4B, and 6, the explanation is presented assuming that no error is included in the command signal from the master device 110. However, in the actual communication between the master device 110 and the physical quantity measurement device 1, it is possible that, for example, an erroneous command signal is output from the master device 110, and that the signal level of a part of the command signal varies due to noise contamination of the communication path. Therefore, in order to perform the reliable communication, it is preferable for the interface section 10 to perform the propriety determination of the command signal from the master device 110, namely to determine whether or not the command signal includes an error.

Further, in order to realize the high-speed data communication system, it is preferable for the interface section 10 to immediately notify the master device 110 of the fact that the command signal includes the error to ask the master device 110 to make a response such as retransmission. Therefore, in the case in which the command signal includes an error, the interface section 10 outputs the NACK signal to immediately inform the master device 110 of the presence of the error.

Figure 7:
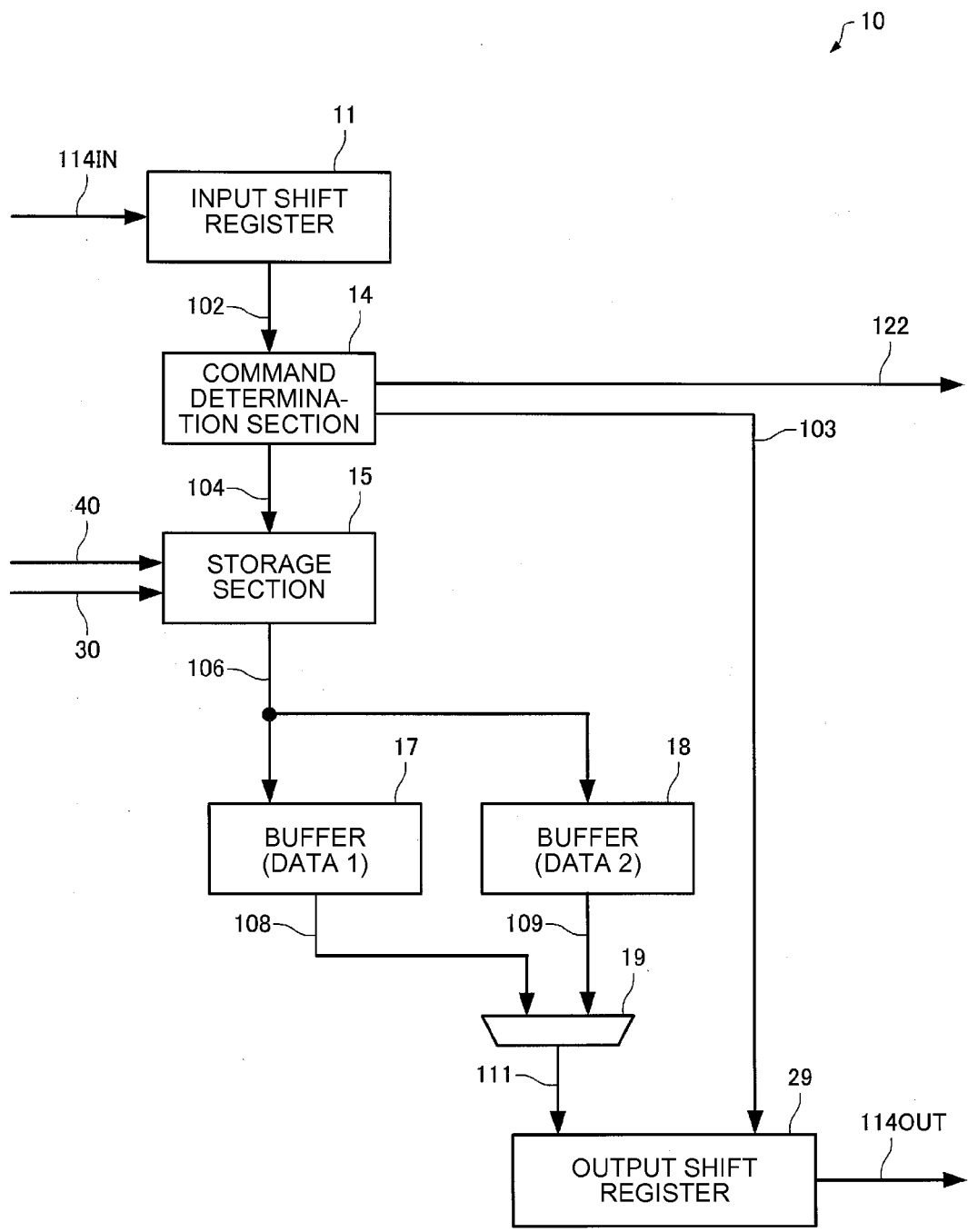
FIG. 7 is a diagram showing a configuration example of a communication circuit according to the embodiment.

FIG. 7 is a diagram showing a configuration example of the interface section 10. The same constituents as those shown in FIGS. 1 through 6 are denoted with the same reference numerals, and the explanation thereof will be omitted. It should be noted that in FIG. 7, the bidirectional serial bus 114 is shown as an input 114IN and an output 114OUT separately from each other for the sake of convenience of explanation.

The interface section 10 includes an input shift register 11 as an input section, a command determination section 14, the storage section 15, buffers 17, 18, a selector 19, and an output register 29.

The interface section 10 converts the command signal received from the master device 110 into a parallel signal (a signal 102) with the input register 11, and then outputs the parallel signal to the command determination section 14.

The command determination section 14 receives the command signal, and then performs the propriety determination based on the mode determined by the type of the command in execution and the type of the command thus received. Details of the propriety determination of the command signal will be described later. The command determination section 14 outputs a signal 103 corresponding to the result of the propriety determination of the command signal to the output shift register 29.

Then, the output shift register 29 outputs the ACK signal/NACK signal compliant with the normal I²C bus communication protocol in the case in which it is determined that the command signal is proper, or outputs the NACK signal in the case in which it is determined that the command signal includes an error.

The interface section 10 takes a configuration in which the output shift register 29 immediately outputs the NACK signal if the command determination section 14 transmits the signal 103 corresponding to the result of the propriety determination of the command signal to the output shift register 29, and it is determined that the command signal is not appropriate. Therefore, the interface section 10 can immediately notify the master device 110 of a defect in the command signal while performing the communication compliant with the I²C bus communication protocol.

In particular, in the case in which the communication protocol is the communication protocol (e.g., the I²C bus communication protocol) using the master-slave system as in the present embodiment, the following can be said. That is, in the case in which it is determined that the command signal is not appropriate, the NACK signal is output as the reply signal to the master device 110 after the interface section 110 of the physical quantity measurement device 1 receives the data signal including the command signal, and before the transmission or the reception of the subsequent data signal is performed. In other words, in the case in which it is determined that the command signal is not appropriate, the interface section 10 of the physical quantity measurement device 1 consistently outputs the NACK signal as the reply signal in response to the reception of the data signal including the command signal from the master device 110. Therefore, the physical quantity measurement device 1 can immediately notify the master device 110 of the propriety determination result of the command signal without requiring the propriety determination result to be transmitted while being included in the data signal. Further, the amount of the information for notifying the master device 110 of the propriety determination result of the command signal is as small as 1 bit of the reply signal transmitted immediately after transmitting the command signal. As a result, an amount of the communication between the master device 110 and the physical quantity measurement device 1 can be reduced. It should be noted that the communication protocol can be another protocol similar to the I²C bus communication protocol.

For example, in FIG. 3, it is assumed that the register address of the register read command signal having been received from the master device 110 is a non-existent address. On this occasion, the command determination section 14 determines that the command signal includes an error. Then, the output shift register 29 having received the signal 103 outputs the NACK signal to the master device 110 instead of the ACK signal denoted with the reference numeral 301 in FIG. 3.

Further, for example, in FIG. 4B, it is assumed that despite the start command signal has already been received, a command signal other than the output command signal is received from the master device 110. On this occasion, the command determination section 14 determines that the command signal includes an error. Then, the output shift register 29 having received the signal 103 outputs the NACK signal to the master device 110 instead of the ACK signal denoted with the reference numeral 302 in FIG. 4B.

Further, for example, in FIG. 6, it is assumed that a command signal other than the software reset 2 is received from the master device 110 in the process of the software reset as the connected command. On this occasion, the command determination section 14 determines that the command signal includes an error. Then, the output shift register 29 having received the signal 103 outputs the NACK signal to the master device 110 instead of the ACK signal denoted with the reference numeral 304 in FIG. 6. As described above, it is possible to immediately notify the master device 110 of the fact that the command signal includes an error using the NACK signal without requiring a new command signal.

Here, going back to FIG. 7 again, the configuration of the interface section 10 will be explained. In the case in which the command signal of the software reset as the connected command signal has been received from the master device 110 without an error, the command determination section 14 sets the software reset signal 122 to the low level to reset the circuit group 22, and then resets the software reset signal 122 to the high level.

Further, in the case in which the register read command signal and the diagnostic command signal (the start command signal and the output command signal) have been received from the master device 110 without an error, the command determination section 14 designates the address of the register storing the data required by the master device 110 using a signal 104.

The storage section 15 is a register for storing, for example, the output signal 40 from the detection section 6 and the fault diagnosis signal 30 from the fault diagnosis section 20. The storage section 15 can be, for example, an SRAM, a DRAM, a nonvolatile memory, or other memory devices. Further, the storage section 15 outputs selected data 106 in accordance with the address (the signal 104) from the command determination section 14.

The buffers 17, 18 are temporary memory devices. In the communication of the present embodiment, for example, the 16-bit (2-byte) data is transmitted and received in twice, 8 bits (1 byte) at a time. In other words, the serial communication is performed in terms of bytes. Therefore, the data 106 are temporarily stored in the buffer 17 and the buffer 18 in a separate manner.

Further, signals 108, 109 output from the respective buffers 17, 18 are selected in sequence by the selector 19. A signal 111 as an output of the selector 19 is converted into a serial signal by the output shift register 29, and then output to the master device 110.

Here, the details of the propriety determination of the command signal performed by the command determination section 14 will be explained. The command determination section 14 determines not only whether or not the code of the command signal is defined in the specification, but also whether or not the command signals are compliant with a given sequence. However, the sequence is given only in the command signals of a specific type. Therefore, the command determination section 14 is provided with operation modes (also referred to simply as modes) determined by the type of the command signal in execution, and thus, it is possible to efficiently perform the propriety determination based on the mode and the type of the command signal received.

FIG. 8 is a diagram showing the command signals, which can be received by the interface section 10, classified according to type. The register read command corresponding to the register read command signal, the start command corresponding to the start command signal, the output command corresponding to the output command signal, and the software reset corresponding to the software reset signal all listed in the command mane shown in FIG. 8 are as described above. In FIG. 8, a command of the case in which the register address designated by the register read command does not exist, and a command of a code not originally existing in the specification are treated as a non-existent command as a form of the command.

In the case of performing the process according to the register read command, namely during the execution of the register read command, the command determination section 14 sets the operation mode to a first mode. The command determination section 14 sets the operation mode to a second mode during the execution of the diagnostic command (the start command, the output command). Further, the command determination section 14 sets the operation mode to a third mode during the execution of the software reset. For example, in the case in which the mode of the command determination 14 is the third mode, when a command signal other than the software reset signal is received, the command determination section 14 can efficiently determine that the command signal includes an error.

Here, the default operation mode is the first mode, and when the communication is started, the command determination section 14 sets the operation mode to the first mode, and then resets the operation mode to the first mode after the execution of the diagnostic command or the software reset command. Further, although the software reset is the connected command, and the five command signals (the software reset 1 through the software reset 5) are received as shown in FIG. 6, in the present embodiment, the explanation is presented assuming that the five command signals have the same code. It should be noted that a part or the whole of the software reset 1 through the software reset 5 can also have respective codes different from each other.

Figure 9:
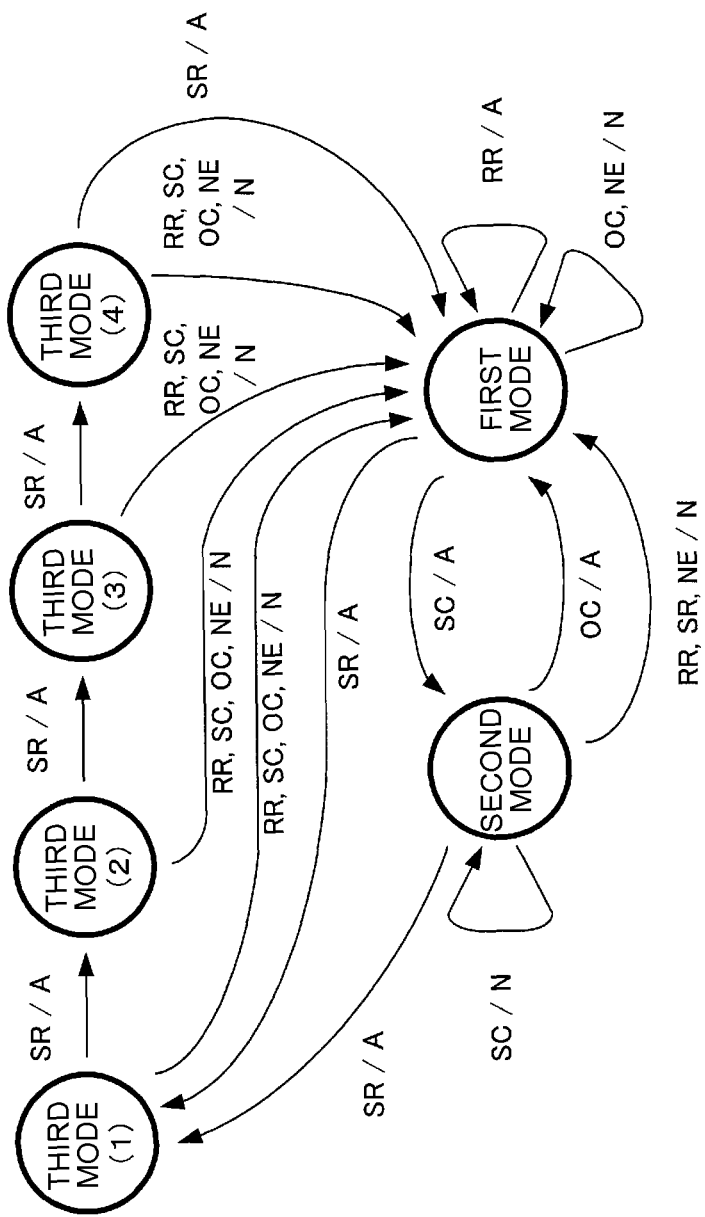
FIG. 9 is a diagram for explaining transitions between modes of a command determination section of the communication circuit according to the embodiment.

FIG. 9 is a diagram for explaining the transitions between the modes of the command determination section 14. FIG. 9 shows the first mode as the default mode, the second mode, and the third mode as the operation modes. The third mode is shown as the third mode (1), the third mode (2), the third mode (3), and the third mode (4) in a separate manner in order to explain the change caused when receiving the command signal of the software reset.

The arrows shown in FIG. 9 each represent a transition of the mode, and symbols representing the type of the command signal received, and which one of the ACK signal and the NACK signal is output to the master device 110 are described together with the arrows. The command signal received is described on the left side of a separating character (/) with the command symbol shown in FIG. 8. Further, a character A is described on the right side of the separating character (/) in the case of outputting the ACK signal, and a character N is described there in the case of outputting the NACK signal.

For example, "RR, SC, OC, NE/N" means that the NACK signal is output to the master device 110, and the command determination section 14 makes the transition of the mode as indicated by the arrow in the case of receiving the register read command signal, the start command signal, the output command signal, or the non-existent command signal. Further, for example, "SR/A" means that the ACK signal is output to the master device 110 and the command determination section 14 makes the transition of the mode as indicated by the arrow in the case of receiving the software reset.

When the communication is started, the mode of the command determination section 14 is set to the first mode as the default mode. When receiving the register read command signal, the command determination section 14 makes the ACK signal be output to the master device 110, and keeps the mode in the first mode ("RR/A"). When receiving the output command signal or the non-existent command signal, the command determination section 14 makes the NACK signal be output to the master device 110, and keeps the mode in the first mode ("OC, NE/N").

Here, when receiving the start command signal, the command determination section 14 makes the ACK signal be output to the master device 110, and changes the mode to the second mode ("SC/A"). Subsequently, when receiving the output command signal, the command determination section 14 makes the ACK signal be output to the master device 110, and changes the mode to the first mode ("OC/A").

It should be noted that in the case in which the mode is set to the second mode, when further receiving the start command signal, the command determination section 14 makes the NACK signal be output to the master device 110, and keeps the mode in the second mode ("SC/N"). Further, when receiving the register read command signal, the software reset, or the non-existent command signal, the command determination section 14 makes the NACK signal be output to the master device 110, and changes the mode to the first mode ("RR, SR, NE/N").

It the case in which the mode is set to the first mode or the second mode, when receiving the software reset, the command determination section 14 makes the ACK signal be output to the master device 110, and changes the mode to the third mode (1) ("SR/A"). Subsequently, when receiving the software reset four times, the command determination section 14 makes the ACK signal be output to the master device 110 after each of the command signals, and changes the mode to the third mode (2), the third mode (3), the third mode (4), and then the first mode ("SR/A").

However, in the case in which the mode is set to the third mode (1) through the third mode (4), when receiving the register read command signal, the start command signal, the output command signal, or the non-existent command signal, the command determination section 14 makes the NACK signal be output to the master device 110, and changes the mode to the first mode ("RR, SC, OC, NE/N").

As described above, the command determination section 14 can efficiently perform the propriety determination based on the modes and the types of the command signals.

3. Communication Method

Figure 10:
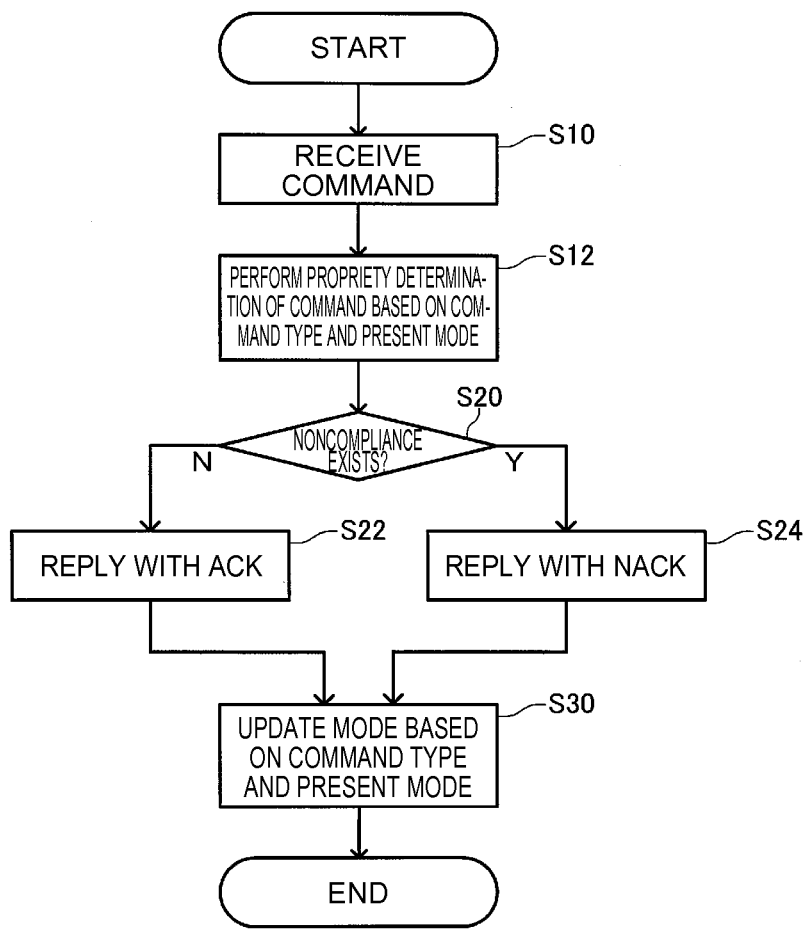
FIG. 10 is a flowchart showing a communication method of the communication circuit according to the embodiment.

FIG. 10 is a flowchart showing a communication method of the interface section 10. The interface section 10 receives (a data signal input step: S10) the command signal including data signal from the master device 110. Then, the propriety determination of the command signal is performed (a propriety determination step: S12) based on the type of the command signal and the present mode. As explained with reference to FIG. 9, the propriety determination is performed by the command determination section 14.

Then, the conditional branching on whether or not the command signal received is proper, namely whether or not a noncompliance (an error) exists in the command signal, based on the result of the propriety determination corresponds to S20. In the case in which the noncompliance exists (Y in S20), the interface section 10 outputs (a reply signal output step for outputting the negative acknowledgement signal:

S24) the NACK signal to the master device 110. Further, in the case in which the noncompliance does not exist (N in S20), the interface section 10 outputs (the reply signal output step for outputting the acknowledgement signal: S22) the ACK signal to the master device 110. The output of the ACK signal or the NACK signal is specifically performed by the output shift register 29, which has received the signal 103 corresponding to the result of the propriety determination of the command signal by the command determination section 14.

The interface section 10 updates (a mode updating step: S30) the mode based on the type of the command signal and the present mode. As explained with reference to FIG. 9, the update of the mode is performed by the command determination section 14.

Since the interface section 10 performs such a communication method as described above, it is possible to immediately notify the master device 110 of a defect in the command signal while performing the data communication compliant with a communication protocol (e.g., the I²C bus communication protocol) using the master-slave system. Therefore, the highly reliable high-speed data communication becomes possible.

4. Electronic Apparatus

An electronic apparatus 300 according to the present embodiment will be explained with reference to FIGS. 11 and 12. It should be noted that the same constituents as those shown in FIGS. 1 through 10 are denoted with the same reference numerals and symbols, and the explanation thereof will be omitted.

Figure 11:
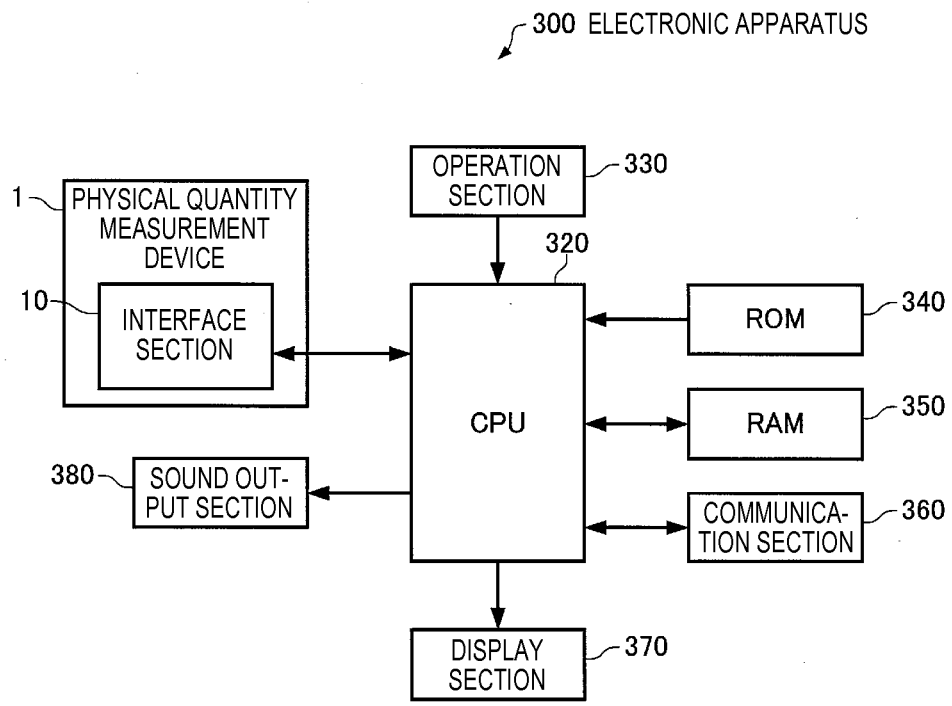
FIG. 11 is a functional block diagram of an electronic apparatus.

FIG. 11 is a functional block diagram of the electronic apparatus 300. The electronic apparatus 300 is configured including the physical quantity measurement device 1 including the interface section 10, a central processing unit (CPU) 320, an operation section 330, a read only memory (ROM) 340, a random access memory (RAM) 350, a communication section 360, a display section 370, and a sound output section 380. It should be noted that the electronic apparatus 300 can also have a configuration obtained by eliminating or modifying some of the constituents (the sections) shown in FIG. 11, or adding another constituent to the configuration described above.

The physical quantity measurement device 1 communicates with the central processing unit (CPU) 320 as the master device using the interface section 10. It should be noted that the description of the functional blocks other than the interface section 10 of the physical quantity measurement device 1 is omitted in FIG. 11.

The CPU 320 obtains the data from the physical quantity measurement device 1 and performs a variety of arithmetic processes and control processes in accordance with the program stored in the ROM 340 and so on. Further, the CPU 320 performs a variety of processes corresponding to the operation signal from the operation section 330, a process of controlling the communication section 360 for performing data communication with external devices, a process of transmitting a display signal for making the display section 370 display a variety of types of information, a process of making the sound output section 380 output a variety of sounds, and so on.

The operation section 330 is an input device including operation keys, button switches, and so on, and outputs the operation signal corresponding to the operation by the user to the CPU 320.

The ROM 340 stores a program, data, and so on for the CPU 320 to perform a variety of arithmetic processes and control processes.

The RAM 350 is used as a working area of the CPU 320, and temporarily stores, for example, the program and data retrieved from the ROM 340, the data input from the operation section 330, and the calculation result obtained by the CPU 320 performing operations in accordance with the various programs.

The communication section 360 performs a variety of control processes for achieving the data communication between the CPU 320 and the external devices.

The display section 370 is a display device formed of a liquid crystal display (LCD) or the like, and displays a variety of information based on a display signal input from the CPU 320.

Further, the sound output section 380 is a device, such as a speaker, for outputting sounds.

In the electronic apparatus 300, the CPU 320 communicates with the physical quantity measurement device 1 via the interface section 10. The interface section 10 determines whether or not the command signal from the CPU 320 includes an error, and can immediately notify the CPU if there is an error. Therefore, the electronic apparatus 300 high in reliability, and quick in response can be realized.

As the electronic apparatus 300, a variety of devices are possible. There can be cited, for example, a network server, a personal computer (e.g., a mobile type personal computer, a laptop personal computer, and a tablet personal computer), a mobile terminal such as a cellular phone, a digital still camera, an inkjet ejection device (e.g., an inkjet printer), a storage area network apparatus such as a router or a switch, a local area network apparatus, a television set, a video camera, a video cassette recorder, a car navigation system, a pager, a personal digital assistance (including one having a communication function), an electronic dictionary, an electronic calculator, an electronic game machine, a gaming controller, a word processor, a workstation, a picture phone, a security television monitor, an electronic binoculars, a POS terminal, a medical instrument (e.g., an electronic thermometer, a blood pressure monitor, a blood glucose monitor, an electrocardiograph, ultrasonic diagnostic equipment, and an electronic endoscope), a fish finder, a variety of measuring instruments, gauges (e.g., gauges for cars, aircrafts, and boats and ships), a flight simulator, a head-mount display, a motion tracer, a motion tracker, a motion controller, and a pedestrian dead reckoning (PDR) system.

Figure 12:
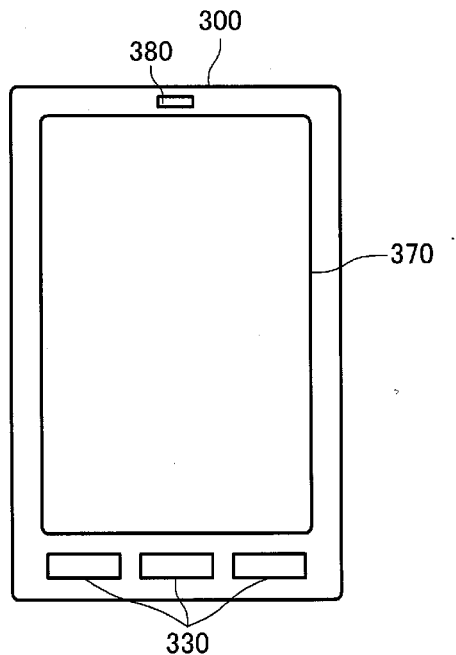
FIG. 12 is a diagram showing an example of an appearance of the electronic apparatus.

FIG. 12 is a diagram showing an example of an appearance of a smartphone as an example of the electronic apparatus 300. The smartphone as the electronic apparatus 300 is provided with buttons as the operation sections 330, and an LCD as the display section 370. Further, the smartphone as the electronic apparatus 300 has the physical quantity measurement device 1 including the interface section 10. Therefore, the reliability is high, and the response at the operation can be quickened.

5. Moving Object

A moving object 400 according to the present embodiment will be explained with reference to FIG. 13.

Figure 13:
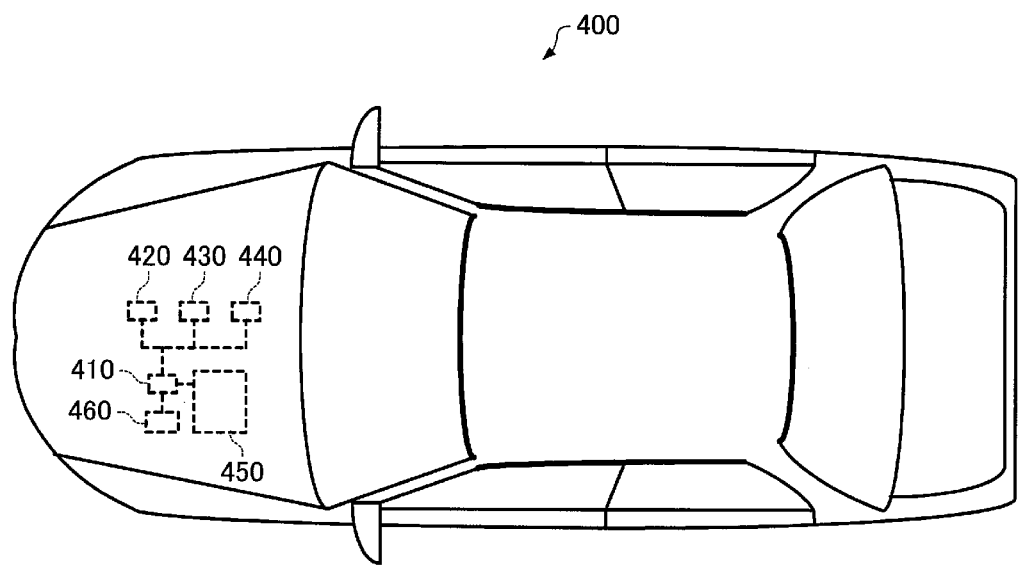
FIG. 13 is a diagram showing an example of a moving object.

FIG. 13 is a diagram (a top view) showing an example of the moving object 400 according to the present embodiment. The moving object 400 shown in FIG. 13 is configured including an oscillator section 410, controllers 420, 430, and 440 for performing a variety of types of control such as an engine system, a brake system, or a keyless entry system, a battery 450, and a backup battery 460. It should be noted that the moving object according to the present embodiment can have a configuration obtained by eliminating or modifying some of the constituents (sections) shown in FIG. 13, or adding another constituent thereto.

The controller 430 has the physical quantity measurement device 1 including the interface section 10. Although the detailed explanation of other constituents will be omitted, high reliability is required in order to perform the control necessary for the movement of the moving object.

Here, in the system of the moving object 400, the controller 430 can immediately detect any error included in the command signal received. Then, it is possible to notify the master device not shown of the error to request an appropriate response. Therefore, the reliability as the moving object 400 can be enhanced.

It should be noted that as such a moving object 400, a variety of types of moving objects can be adopted, and a vehicle (including an electric vehicle), an aircraft such a jet plane or a helicopter, a ship, a rocket, an artificial satellite, and so on can be cited.

6. Other Issues

The invention includes configurations (e.g., configurations having the same function, the same way, and the same result, or configurations having the same object and the same advantage) substantially the same as the configuration described in the embodiment described above. Further, the invention includes configurations obtained by replacing a non-essential part of the configuration described as the embodiment. Further, the invention includes configurations providing the same functions and the same advantage, or configurations capable of achieving the same object, as the configuration described as the embodiment. Further, the invention includes configurations obtained by adding a known technology to the configuration described as the embodiment.

The entire disclosure of Japanese Patent Application No. 2013-091038, filed Apr. 24, 2013 is expressly incorporated by reference herein.

What is claimed is:

1. A communication circuit comprising:
    an input section to which a data signal is input;
    an output section adapted to output a reply signal in a case in which the data signal is input; and
    a command determination section adapted to perform propriety determination of a command signal included in the data signal,
    wherein the output section outputs a negative acknowledgement signal as the reply signal in a case in which it is determined in the propriety determination that the command signal is improper.

2. A communication circuit comprising:
    an input section to which a data signal is input;
    an output section adapted to output a reply signal subsequently to the input; and
    a command determination section adapted to perform propriety determination of a command signal included in the data signal,
    wherein the output section outputs a negative acknowledgement signal as the reply signal in a case in which it is determined in the propriety determination that the command signal is improper.

3. The communication circuit according to claim 1, wherein
    the output section outputs the negative acknowledgement signal in a case in which the command signal designates a non-existent register address.

4. The communication circuit according to claim 1, wherein
    the output section outputs the negative acknowledgement signal in a case in which the command signals are input to the input section in a sequence different from a proper sequence of a plurality of command signals constituting a connected command.

5. The communication circuit according to claim 4, wherein
    the connected command corresponds to software reset.

6. The communication circuit according to claim 4, wherein
    the connected command corresponds to a diagnostic command signal.

7. The communication circuit according to claim 1, wherein
    the command determination section performs the propriety determination based on a mode determined by the command signal, and the command signal.

8. The communication circuit according to claim 1, wherein
    the output section outputs an acknowledgement signal as the reply signal in a case in which it is determined in the propriety determination that the command signal is proper.

9. The communication circuit according to claim 8, wherein
    the input section performs the input in accordance with an I$^2$C communication protocol,
    the acknowledgement signal corresponds to an ACK signal in the I$^2$C communication protocol, and
    the negative acknowledgement signal corresponds to an NACK signal in the I$^2$C communication protocol.

10. A physical quantity measurement device comprising:
    the communication circuit according to claim 1; and
    a sensor element adapted to output a detection signal corresponding to a physical quantity.

11. A physical quantity measurement device comprising:
    the communication circuit according to claim 2; and
    a sensor element adapted to output a detection signal corresponding to a physical quantity.

12. A physical quantity measurement device comprising:
    the communication circuit according to claim 3; and
    a sensor element adapted to output a detection signal corresponding to a physical quantity.

13. An electronic apparatus comprising:
    the communication circuit according to claim 1.

14. An electronic apparatus comprising:
    the communication circuit according to claim 2.

15. An electronic apparatus comprising:
    the communication circuit according to claim 3.

16. A moving object comprising:
    the communication circuit according to claim 1.

17. A moving object comprising:
    the communication circuit according to claim 2.

18. A moving object comprising:
    the communication circuit according to claim 3.

* * * * *